(12) United States Patent
Hayami et al.

(10) Patent No.: US 8,155,436 B2
(45) Date of Patent: Apr. 10, 2012

(54) SYSTEMS AND METHODS FOR COLOR DATA COMPRESSION

(75) Inventors: Isao Hayami, Yokohama (JP); Peter Johnston, San Francisco, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1045 days.

(21) Appl. No.: 12/078,417

(22) Filed: Mar. 31, 2008

(65) Prior Publication Data

US 2009/0245629 A1    Oct. 1, 2009

(51) Int. Cl.
*G06K 9/36* (2006.01)
(52) U.S. Cl. .................................................. 382/166
(58) Field of Classification Search .......... None
See application file for complete search history.

(56) References Cited

U.S. PATENT DOCUMENTS

| | | | |
|---|---|---|---|
| 5,610,646 A | 3/1997 | Isaka et al. | |
| 5,680,488 A | 10/1997 | Shimooku | |
| 5,739,920 A | 4/1998 | Nakajima et al. | |
| 5,764,804 A | 6/1998 | Yajima et al. | |
| 5,841,552 A | 11/1998 | Atobe et al. | |
| 5,907,666 A | 5/1999 | Yano et al. | |
| 5,963,672 A | 10/1999 | Yajima et al. | |
| 6,002,794 A | 12/1999 | Bonneau et al. | |
| 6,041,165 A | 3/2000 | Morikawa | |
| 6,078,689 A | 6/2000 | Kunitake et al. | |
| 6,106,093 A | 8/2000 | Nagoshi et al. | |
| 6,342,950 B1 | 1/2002 | Tabata et al. | |
| 6,402,294 B2 | 6/2002 | Minowa | |
| 6,552,819 B2 | 4/2003 | Osawa et al. | |
| 6,570,672 B1 | 5/2003 | Hattori | |
| 6,614,553 B2 | 9/2003 | Nakami et al. | |
| 6,650,436 B1 * | 11/2003 | Hamamoto et al. | 358/1.9 |
| 6,694,061 B1 | 2/2004 | Acharya | |
| 6,728,317 B1 * | 4/2004 | Demos | 375/240.21 |
| 6,754,394 B2 | 6/2004 | Boliek et al. | |
| 6,776,544 B2 | 8/2004 | Jauert | |
| 6,795,211 B1 | 9/2004 | Eschbach et al. | |
| 6,853,755 B2 | 2/2005 | Li | |
| 7,035,459 B2 * | 4/2006 | Ishiga | 382/166 |
| 7,130,474 B2 | 10/2006 | Luo et al. | |
| 7,146,039 B2 * | 12/2006 | Ishiga | 382/166 |

(Continued)

FOREIGN PATENT DOCUMENTS

GB    2 372 898    9/2002

(Continued)

OTHER PUBLICATIONS

U.S. Appl. No. 12/078,415, filed Mar. 31, 2008.

(Continued)

*Primary Examiner* — Yuzhen Ge
(74) *Attorney, Agent, or Firm* — Finnegan, Henderson, Farabow, Garrett & Dunner, L.L.P.

(57) ABSTRACT

Systems and methods are provided for reducing data size of at least one bitmap image, wherein the bitmap image comprises a plurality of image components, wherein each image component is associated with a distinct color plane. The plurality of color planes may be ranked using a dominance rank, wherein the dominance rank for a color plane is based on data in its associated image component. The data size of the at least one image component may be reduced based on the dominance rank of the color plane associated with the image component.

16 Claims, 5 Drawing Sheets

U.S. PATENT DOCUMENTS

| | | | |
|---|---|---|---|
| 7,154,631 B2 * | 12/2006 | Gonzalez et al. | 358/1.2 |
| 7,171,045 B1 | 1/2007 | Hamilton | |
| 7,330,273 B2 | 2/2008 | Podoleanu et al. | |
| 7,352,374 B2 * | 4/2008 | Brown Elliott et al. | 345/613 |
| 7,359,324 B1 | 4/2008 | Quellette et al. | |
| 7,359,549 B2 * | 4/2008 | Ikebe et al. | 382/166 |
| 7,380,929 B2 | 6/2008 | Silverbrook | |
| 7,382,925 B2 | 6/2008 | Boliek et al. | |
| 7,397,575 B2 | 7/2008 | Sekiguchi | |
| 7,418,144 B2 | 8/2008 | Wang et al. | |
| 7,418,148 B2 | 8/2008 | Hayashi | |
| 7,439,739 B2 | 10/2008 | Beatty | |
| 7,440,140 B2 | 10/2008 | Lee et al. | |
| 7,474,793 B2 | 1/2009 | Weissman et al. | |
| 7,567,723 B2 | 7/2009 | Sakakima | |
| 7,589,853 B2 | 9/2009 | Konji et al. | |
| 7,646,928 B2 * | 1/2010 | Kimura et al. | 382/233 |
| 7,693,328 B2 | 4/2010 | Moritani | |
| 8,040,537 B2 | 10/2011 | Smith | |
| 2001/0041056 A1 | 11/2001 | Tanaka et al. | |
| 2001/0043342 A1 * | 11/2001 | Suzuki | 358/1.9 |
| 2002/0054335 A1 | 5/2002 | Sekiguchi | |
| 2002/0054711 A1 | 5/2002 | Hwang et al. | |
| 2002/0113981 A1 * | 8/2002 | Nakajima | 358/1.8 |
| 2002/0186382 A1 * | 12/2002 | Gonzalez et al. | 358/1.2 |
| 2003/0026477 A1 * | 2/2003 | Ishiga | 382/166 |
| 2003/0164958 A1 * | 9/2003 | Shima et al. | 358/1.7 |
| 2004/0114199 A1 | 6/2004 | Kanno | |
| 2004/0126019 A1 * | 7/2004 | Ikebe et al. | 382/232 |
| 2004/0184079 A1 | 9/2004 | Sakamoto | |
| 2004/0213604 A1 | 10/2004 | Koide | |
| 2005/0007609 A1 | 1/2005 | Itagaki et al. | |
| 2005/0069214 A1 | 3/2005 | Hayashi | |
| 2005/0162694 A1 | 7/2005 | Chiba et al. | |
| 2005/0179928 A1 | 8/2005 | Ohta | |
| 2005/0271285 A1 * | 12/2005 | Kimura et al. | 382/233 |
| 2007/0230561 A1 | 10/2007 | Ichieda | |
| 2007/0269104 A1 * | 11/2007 | Whitehead et al. | 382/162 |
| 2009/0244601 A1 | 10/2009 | Johnston | |
| 2009/0244633 A1 | 10/2009 | Johnston | |
| 2009/0245630 A1 | 10/2009 | Johnston | |
| 2009/0245665 A1 | 10/2009 | Johnston | |
| 2009/0324109 A1 | 12/2009 | Johnston | |

FOREIGN PATENT DOCUMENTS

| | | |
|---|---|---|
| JP | 2003008862 | 1/2003 |
| JP | 2003-125202 | 4/2003 |
| JP | 2003191572 | 7/2003 |

OTHER PUBLICATIONS

Office Action dated May 13, 2011, in related U.S. Appl. No. 12/078,415, filed Mar. 31, 2008.

Notice of Allowance dated Oct. 20, 2011, in related U.S. Appl. No. 12/078,415, filed Mar. 31, 2008.

U.S. Appl. No. 12/242,632, filed Sep. 30, 2008.

Office Action dated Mar. 21, 2011, in related U.S. Appl. No. 12/242,632, filed Sep. 30, 2008.

U.S. Appl. No. 12/261,745, filed Oct. 30, 2008.

Notice of Allowance dated Jul. 22, 2011, in related U.S. Appl. No. 12/261,745, filed Oct. 30, 2008.

U.S. Appl. No. 12/324,560, filed Nov. 26, 2008.

Office Action dated Oct. 26, 2011, in related U.S. Appl. No. 12/324,560, filed Nov. 26, 2008.

U.S. Appl. No. 12/165,596, filed Jun. 30, 2008.

Notice of Allowance dated Sep. 20, 2011, in related U.S. Appl. No. 12/165,596, filed Jun. 30, 2008.

* cited by examiner

SYSTEMS AND METHODS FOR COLOR DATA COMPRESSION

TECHNICAL FIELD

This disclosure relates to data compression for printing systems and in particular, to systems and methods for color data compression on laser printers.

DESCRIPTION OF RELATED ART

A typical printing system may include a print engine that controls various mechanical and electrical parts configured to print data on a page at a predetermined print speed. The print engine is usually controlled by a print controller, which communicates with a print data input device (e.g., a personal computer) and the print engine, to coordinate timing and other parameters related to the printing process. The print controller may receive image data for printing from the input device at an appropriate rate via a data transferring interface, can generate rasterized images, and send them to the print engine for printing.

Some printing systems, such as laser printing systems, may have hard real time requirements so that once a print job has been initiated, data must be transferred to the print engine at a set speed without interruption. However, the bandwidth of the data transferring interface sometimes may not be sufficient to sustain the print speed. For instance, a page containing high resolution images may have a large data size even after image compression. When such a page is being transferred to the print controller from a print data input device at the print speed, the image data may exceed the bandwidth for some time period. As a result, the page for printing may not be completely transmitted to the print controller and print engine before the physical printing starts resulting in a data under-run. Consequently, the page may not be printed properly. The performance of the printing system may therefore be significantly compromised.

Conventionally, the printer controller may include a page buffer capable of buffering an entire page before printing commences. This may allow for some flexibility in how the print data is transferred to the print controller from the print data input device. For example, in order to store a full page of print data including high resolution images, the print controller may use a large amount of additional memory for both code and data storage. This may add substantial cost to the printing system. In addition, memory cannot typically be added by users to many existing printers, so an approach using additional memory will not help printers already on the market. Therefore, there is a need for systems and methods that provide a reliable printing solution that can be implemented for existing printers and that obviates the need for additional memory in the print engine.

SUMMARY

In accordance with the present invention, systems and methods are provided for reducing data size of at least one bitmap image, wherein the bitmap image comprises a plurality of image components, wherein each image component is associated with a distinct color plane. The plurality of color planes may be ranked using a dominance rank, wherein the dominance rank for a color plane is based on data in its associated image component. The data size of the at least one image component may be reduced based on the dominance rank of the color plane associated with the image component.

Embodiments of the present invention also relate to software, firmware, and program instructions created, stored, accessed, or modified by processors using computer-readable media or computer-readable memory. The methods described may be performed on a computer and/or a printing device.

Additional objects and advantages will be set forth in part in the description, which follows, and in part will be obvious from the description, or may be learned by practice. The objects and advantages will be realized and attained by means of the elements and combinations particularly pointed out in the appended claims. It is to be understood that both the foregoing general description and the following detailed description are exemplary and explanatory only and are not restrictive of the invention, as claimed. These and other embodiments are further explained below with respect to the following figures.

DETAILED DESCRIPTION

Reference will now be made in detail to various embodiments, which are illustrated in the accompanying drawings. Wherever possible, the same reference numbers will be used throughout the drawings to refer to the same or like parts.

Figure 1:
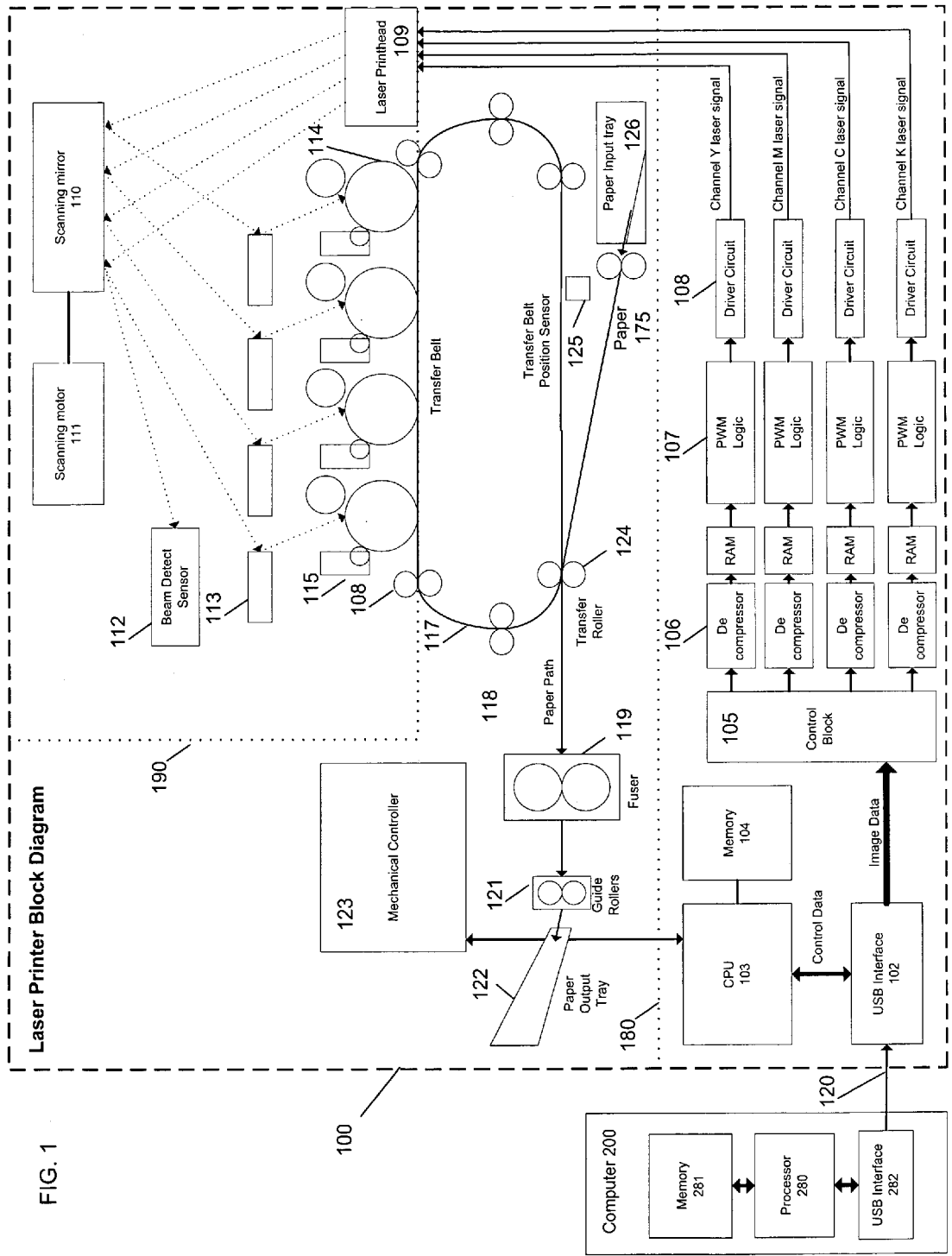
FIG. 1 shows a block diagram of an exemplary printer.

FIG. 1 is a block diagram of exemplary printer 100, which is coupled to exemplary computer 200. In some embodiments, printer 100 may be a laser printer, an LED printer, or any other printer consistent with principles of the present invention. Connection 120 couples computer 200 and printer 100 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 200, and printer 100.

In some embodiments, connection 120 may operate at a predetermined data transferring frequency, or may otherwise have limited bandwidth. For example, connection 120 may operate at a determined frequency of 480 MHz and the corresponding maximum raw bandwidth may be 60 M bytes per second. In some embodiments, the maximum transfer rate of raw data may be lower than the maximum raw bandwidth due to encoding and protocol overhead. Under some exemplary protocols, an isochronous mode of transfer may be supported so that a certain amount of bandwidth may be reserved and data delivery at a corresponding transfer rate may be guaranteed. When the guaranteed transfer rate is lower than the rate at which the print engine consumes image data (i.e., print speed), data under-runs may occur on printer 100.

In some embodiments, the bandwidth of connection 120 may be divided into a plurality of sub-channels, and certain amounts of bandwidth may be reserved for each channel and data delivery at a corresponding transfer rate may be guaranteed for each channel. Data may be transferred via the plurality of sub-channels in a parallel manner. For example, for CMYK color printers, which use cyan ("C"), magenta ("M"), yellow ("Y"), and black ("K"), the print color data may have four planes, and data for each color plane may be transferred via a separate sub-channel of connection 12. In some embodiments, a same band-width may be reserved for each sub-channel. In some embodiments, various band-widths may be reserved for different sub-channels.

In one exemplary embodiment, a USB interface 102 may be used as an interface to receive data via a serial pipe. It is contemplated that other interfaces may be used to receive data via other types of connection 120, such as, for example, FIREWIRE or wireless. Data received by USB interface 102 may be routed internally along internal data paths or data and control signal paths, such as a data bus, to various internal functional modules of printer 100 as determined by control logic in printer 100. In some embodiments, data transmitted to printer 100 by computer 200 may also include destination addresses and/or commands to facilitate routing.

In some embodiments, CPU 103, memory 104, control block 105, de-compressor module 106 with attached RAM, PWM logic module 107, and driver circuit 108 may be coupled using the data bus. Data received by USB interface 102 may be placed in memory 104 under the control of the CPU 103 according to some embodiments of the present invention. De-compressor 106 and attached RAM may also be coupled to PWM logic module 107. In some embodiments, de-compressor module 106 may receive compressed image data, decompress the received image data, store the decompressed data in RAM, and send the data to PWM logic module 107.

Various data and control signal paths may couple PWM logic module 107, driver circuit 108, printhead 109, mechanical controller 123, beam detect sensor 112 and transfer belt position sensor 125. In some embodiments, printhead 109 may be a laser printhead. In some embodiments, beam detect sensor 112 may generate a start of scan (SOS) or "hsync" signal for each scan line in an image, or for a set of scan lines in an image, and send the generated signal to mechanical controller 123, which then sends signal to PWM logic module 107.

Driver circuit 108 may be communicatively coupled to PWM logic module 107 and printhead 109. In some embodiments, scanning mirror 110 may be mechanically or electromagnetically coupled to scanning motor 111, which may be used to rotate scanning mirror 110. Each laser beam from printhead 109 may be transmitted to scanning mirror 110 and scanning mirror 110 may reflect that beam, at different times, to beam detect sensor 112 and optical system 113, which may include a cylindrical lens, an f-theta lens, a guide lens, and so on. Optical system 113 may guide laser beams from scanning mirror 110 to photosensitive drum 114. Drum charger 116 may be used to charge photosensitive drum 114. Although only one set of scanning mirror 110, scanning motor 111, and beam detect sensor 112 is illustrated in this figure, four sets of the scanning mirror 110, scanning motor 111, and beam detect sensor 112 may respectively be provided for the laser beams. In this case, each beam detect sensor 112 generates an SOS signal.

In some embodiments, latent images from photosensitive drum 114 may be developed with a toner at developing station 115 before transferring to paper 175. Paper 175 may be passed from paper input tray 126 through transfer rollers 124 to transfer belt 117 where toner images developed at developing station 115 and accumulated on transfer belt 117, may be transferred to paper 175. After the image has been transferred, paper 175 may be moved over paper path 118 using transfer rollers 124 and past fuser 119, guide rollers 121, and to paper output tray 122. In some embodiments, fuser 119 may facilitate the fixing of the transferred image to paper 175.

In an exemplary embodiment, printer 100 may include a printer controller 180 and a printer engine 190. Printer controller 180 may be configured to process image data received from computer 200 via connection 120, and send the processed data to print engine 190 for printing. Printer controller 180 of printer 100 may include, among other things, a USB interface 102, a CPU 103, a memory 104, a control block 105, at least one de-compressor module 106 with attached random access memory ("RAM"), at least one pulse width modulation ("PWM") logic module 107, and at least one driver circuit 108. Exemplary printer engine 190 of printer 100 may include beam detect sensor 112, optical system 113, developing station 115, photosensitive drum 114, drum charger 116, scanning mirror 110, scanning motor 111, and printhead 109. The various modules and subsystems described above may be implemented by hardware, software, or firmware or by various combinations thereof.

In some embodiments, computer 200 may send image data to printer controller 180 over connection 120. The image data sent from the computer 200 may be compressed. In some embodiments, the compressed image data may be in a line-sequential compressed format. After image data is received by USB interface 102, the image data may be placed in memory 104 under the control of CPU 103. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses (SOS signals) that are sent to printer controller 180 so that image data can be properly aligned from line to line in a printed image. In some embodiments, at the beginning of a scan of each line of the image, light from the printhead 109 may be reflected by scanning mirror 110 onto beam detect sensor 112. Beam detect sensor 112 may signal mechanical controller 123 which, in turn, may send a SOS signal to PWM logic module 107. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, in some embodiments, a TOD signal may be sent to PWM logic module 107 via mechanical controller 123. Once the TOD signal is received, CPU 103 may initiate a transfer from memory 104 to de-compressor module 106. In some embodiments, de-compressor module 106 may decompress the image data and pass the resulting raw image data to PWM logic module 107. The resultant PWM pulses from PWM logic module 107 may then be streamed to driver circuit 108, which may then transmit the PWM pulses to printhead 109.

In some embodiments, a laser beam from printhead 109 may be modulated and reflected off scanning mirror 110 and optical system 113, causing a latent image of charged and discharged areas to be built up on photosensitive drum 114. In some embodiments, toner develops this latent image at the developing station 115 and the toner image may be transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. Toner images for all four colors may be accumulated on transfer belt 117 before a complete toner image is transferred to the page at transfer roller 124.

In some embodiments, when all components have been assembled on transfer belt 117, paper 175 may be fed from paper input tray 126 to transfer roller 124 where the image may be further transferred to paper 175. Fuser 119 may then fix the toner to paper 175, which is sent to paper output tray 122 using guide rollers 121. In some embodiments, the rate that the images are transferred to paper 175 (i.e., the print speed) may be determined by the rotational speed of transfer belt 117. For example, once the rotational speed is set for the transfer belt 117, the print speed may become constant and any delay in image data transfer to print engine 190 may cause video under-runs and the page may not be printed properly.

A pixel clock generation module (not shown) may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module may be fixed among each pass of the printer. In an example multi-pass printer 100, the pixel clock generation module may be a crystal oscillator. In another embodiment, such as a printer 100 that uses multiple sets of printer engine 190, sometimes collectively referred to as a "tandem engine", the frequency of each channel may be calibrated if the frequencies differ among the pixel clocks corresponding to each of the color components. In such embodiments, one or more programmable clock oscillators may be used to allow calibration.

Exemplary embodiments of printer 100 may include driver circuit 108 driving multiple sets of printer engine 190, which may be connected to multiple printheads 109. In some embodiments, printheads 109 could all be laser printheads. There may also be a plurality of individual modules of printer controller 180. For example, a single de-compressor module 106 may be connected to multiple PWM logic modules 107 with each PWM module 107 being connected to one or more pixel clock generation modules and one or more driver circuits 108. De-compressor module 106 and attached RAM could provide each PWM logic module 107 with one or more color components of an image, which would then be sent to the multiple driver circuits 108 for onward transmission to one or more sets of printer engine 190.

In other embodiments, multiple de-compressor modules 106 may be coupled to multiple PWM logic modules 107. Each de-compressor module 106 may provide a PWM logic module 107 with a decompressed component of the image. For example, for a multi-component image in CMYK color space, which contains cyan ("C"), magenta ("M"), yellow ("Y"), and black ("K") image components, each individual image component may be processed by each de-compressor module 106 and sent down to each corresponding PWM logic module 107 in a parallel manner.

In some embodiments, different compression algorithms may be used for the different image components to achieve optimal compression. For example, simple algebraic compression may be used for compressing C, M and K components, and JPEG may be used for compressing the Y component. In some embodiments, the same compression algorithm may be used with different compression parameters for different image components to achieve desired compression ratios. For example, a lower compression ratio of JPEG may be used for compressing C, M and K components, and a higher compression ratio of JPEG may be used for compressing the Y component. In some embodiments, information related to the compression algorithms and parameters used to compress the color data may be transferred to printer 100 via connection 120, along with the compressed color data. De-compressor module 106 may then de-compress each image components with the appropriate de-compression algorithms.

In some embodiments, printer 100 may have multiple lasers per laser printhead 109. In some embodiments, printhead 109 may receive multiple lines of data from driver circuit 108 and project the multiple lines of data to scanning mirror 110. Scanning mirror 110 may then reflect the multiple lines of data to beam detect sensor 112 and optical system 113, which may reflect the multiple lines to photosensitive drum 114. In some embodiments, the beam detect sensor 112 may detect a signal, such as a laser signal, reflected off of the scanning mirror 110, or may also detect multiple signals reflected off scanning mirror 110.

Each of the logical or functional modules described above for printer 100 may comprise multiple modules. The modules may be implemented individually or their functions may be combined with the functions of other modules. Further, each of the modules may be implemented on individual components, or the modules may be implemented as a combination of components.

Exemplary computer 200 may be a computer workstation, desktop computer, laptop computer, or any other computing device capable of being used with printer 100. In some embodiments, exemplary computer 200 may include, among other things, a processor 280, a memory 281, and a USB interface 282. Processor 280 may be a central processing unit ("CPU"). Depending on the type of computer 200 being used, processor 280 may include one or more printed circuit boards, and/or a microprocessor chip. Processor 280 may execute sequences of computer program instructions to perform various processes. The computer program instructions may be accessed and read from memory 281, or any other suitable memory location, and be executed by processor 240. Memory 281 may be any type of Dynamic Random Access Memory ("DRAM") such as, but not limited to, SDRAM, or RDRAM.

In one exemplary embodiment, a USB interface 282 may be included in computer 200 as an interface to send and receive data via a serial pipe. For example, USB interface 282 may be coupled to processor 280 to receive data to be printed and send the data to printer 100 via connection 120. It is contemplated that other interfaces may also be used to send data via other types of connection 120, such as, for example, parallel port, FIREWIRE or wireless interfaces.

In order to avoid data under-runs on printer 100, a full page of image data can be transferred from computer 200 to printer 100 at a speed higher than or at least equal to the print speed of printer 100. A color data compression application, such as a color data resolution switching application and/or a color data compression ratio switching application, may be included in computer 200 to reduce the size of the color image data when needed, so that the image data transfer rate does not exceed the bandwidth of connection 120. In some embodiments, the resolution switching application may run on computer 200. It is also contemplated that the color data compression application may be stored on a removable computer readable medium, such as a hard drive, computer disk, CD-ROM, DVD ROM, CD±RW or DVD±RW, USB flash drive, memory stick, or any other suitable medium.

Figure 2:
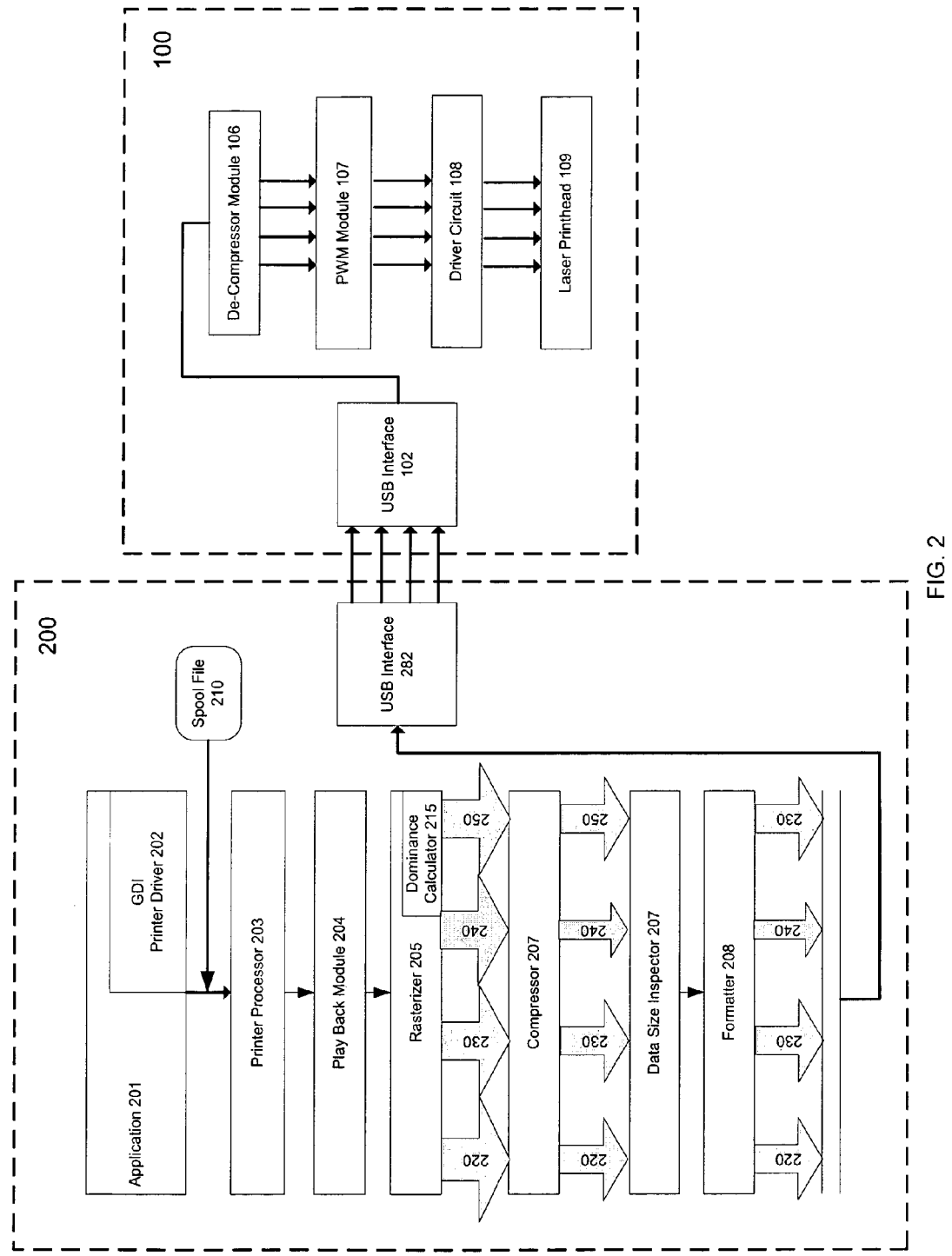
FIG. 2 shows a block diagram indicating an exemplary data flow between an exemplary computer and an exemplary printer for color data compression.

FIG. 2 shows a block diagram indicating an exemplary data flow between an exemplary computer and an exemplary printer for color data compression, according to disclosed embodiments. In an exemplary embodiment, a print job may be initiated by an application 201 running on computer 200. For example, application 210 may use a graphic device interface ("GDI") and printer driver 202 to generate a description of the print job. The description may include the image data to be printed, such as a letter or a picture, and formatting and printing instructions that form the image data into a properly printed page. In some embodiments, application 201 may use GDI and printer driver 202 to format the description in the form of meta-data and generate a print spool file 210.

The size of the image data may vary depending on the number of color planes associated with the data and the resolution of the image. In some embodiments, the image data may include multiple components associated with multiple color planes. For example, the image may be in a CMYK color space and may contain cyan ("C"), magenta ("M"), yellow ("Y"), and black ("K") image components. Each image component may be processed and/or transferred one after another, or in a parallel manner. In some embodiments, the formatting and printing instructions may be created and stored as a header in print spool file 210. In some embodiments, the size of the header file may be relatively constant across print jobs.

In some embodiments, generated print spool file 210 may be sent to a printer processor 203 on computer 200. Printer processor 203 may perform tasks such as collating on print spool file 210 before sending print spool file 210 to a playback module 204 for playback. In some embodiments, playback module 204 may create a list of simple objects that can be rasterized by rasterizer 205, based on the GDI description in print spool file 210.

Print spool file 210 may then be sent to a rasterizer 205. Rasterizer 205 may be configured to transform the image data in print spool file 210 into bitmap data. Rasterizer 205 may further include a frame buffer that can contain information related to how pixels will be printed by printer 100 on a print medium. Rasterized bitmap data may be stored in a frame buffer. In some embodiments, rasterizer 205 may transform the image data block by block, when the size of the image data is relatively large. In some embodiments, computer 200 may include a plurality of rasterizers configured to rasterize color data into a plurality of bitmaps. For example, as shown in FIG. 2, rasterizer 205 may be able to rasterize C-plane color data 220, M-plane color data 230, Y-plane color data 240, and K-plane color data 250 in parallel. In some embodiments, rasterizer 205 may include sub-rasterizer modules corresponding to individual color planes, where each sub-rasterizer module may operate on data in its respective color plane.

Consistent with one embodiment of the present disclosure, rasterizer 205 may further include a dominance calculator 215 to determine an order of dominance between a plurality of color planes with respect to an image. A color plane can be considered "dominant" with respect to an image, if the color data in that color plane contributes to the printed color image to a greater degree than data in the other color planes. In some embodiments, dominance may be determined in accordance with the sensitivity of the human eye. Therefore, when viewing an image, the dominant color may evoke greater sensitivity in the human eye. For example, a more dominant color plane may include denser data than a less dominant color plane in representing the printed image. As another example, data in a more dominant color plane may have a higher resolution than data in a less dominant color plane.

Various algorithms may be used by dominance calculator 215 to determine the dominance of one color relative to other colors. In some embodiments, an order of dominance between color planes, for an image, may be determined by counting the number of bitmap dots in each color plane and ranking the planes based on the count. For example, a color with the lowest number of bitmap dots may be determined as the least dominant color. In some other embodiments, order of dominance between color planes may also be determined by generating gradation histograms for each color and ranking the colors based on the complexity of the histograms. A gradation histogram may be a histogram chart indicating the distribution of color gradation in an image. For example, complexity of the histogram may be affected by the breadth, number of peaks, and other parameters of the histogram. For an image, the color plane with the simplest gradation histogram may be determined to be the least dominant color plane. For example, the Y-plane may be determined as the least dominant color plane for a CMYK color image. Dominance calculator 215 may assign a number to each color plane indicating its dominance rank among the color planes. For example, a smaller number may be assigned to a less dominant color plane.

Consistent with one embodiment of the present disclosure, rasterizer 205 may be further configured to determine color planes, whose dominance rank is below a pre-determined rank threshold, and computes two components of the image data for these images. In some embodiments, these components could correspond to a lower resolution image component and a delta image component, for the image data of these color planes. For example, the original color data of a particular color plane in print spool file 201 may have a resolution of 600 dpi. Rasterizer 205 may compute a lower resolution image with a resolution of 480 dpi and a delta image that represents the difference information between the original image of that plane and the lower resolution image. In some embodiments, the delta image may include a portion of the original high resolution image data. In some embodiments, the delta image can be used to recover the original higher resolution image when used in conjunction with the lower resolution image of the original image. The computation used to compute the delta image may be mathematically reversed to reconstruct the original image from the lower resolution image and the delta image.

In some embodiments, resolution may be reduced in only one physical dimension. For example, resolution may be reduced only in the main scanning direction (i.e., perpendicular to the direction in which paper is fed to a printer) so that the image data transfer rate keeps up with print speed. For example, if paper is fed to the printer along its length (i.e. vertically) then resolution may be reduced in the horizontal direction. In some embodiments, resolution may be reduced in both dimensions (horizontal and vertical). Various other algorithms may be used to compute the lower resolution image and the delta image, such as applying low-pass and high-pass filters to the original image.

Rasterized image data (bitmap data) may be compressed by compressor 206. Compression may reduce the size of the image data, and therefore reduce the amount of bandwidth needed at connection 120 for transferring the image data. In some embodiments, compressor 206 may use lossless compression methods such as, for example, JBIG and GIF compressions, so that the image may be perfectly reconstructed by decompression at de-compressor module 106. When lossless compression is used, the image quality may be preserved through the compression and decompression process. However, a high compression ratio cannot always be guaranteed for lossless compressions. For example, images containing high resolution details may not always compress well, i.e., the size of the compressed image may sometimes be comparable to the size of the original image before compression.

In some other embodiments, compressor 206 may use lossy compression methods such as, for example, JPEG and wavelet compressions. Using lossy compression may yield higher compression ratios on average than lossless compression, but exact reconstruction of the original image from the compressed data may not always be achieved. In some embodiments, compressor 206 may also be configured to use a combination of various compression algorithms. For example, compressor 206 may also be configured to use a combination of lossless compression and lossy compression to achieve a balance between image quality and compression ratio.

In some embodiments, computer 200 may include a plurality of compressors configured to compress color data in the color planes. For example, as shown in FIG. 2, compressor 206 may include four sub-compressors for compressing C-plane color data 220, M-plane color data 230, Y-plane color data 240, and K-plane color data 250 in parallel. In some embodiments, the same compression algorithm and parameters may be applied to color data in all the color planes.

In some embodiments, different compression algorithms may be used with the different image components to achieve optimal compression. For example, simple algebraic compression may be used to compress color data of higher dominance, and JPEG may be used to compress color data of lower dominance. In some embodiments, the same compression algorithm may be used for different image components, albeit with different compression parameters, to achieve desired compression ratios. For example, compression ratio can be varied by being more or less aggressive in the divisors used in the quantization phase of JPEG compression. A higher compression ratio may more significantly affect the image quality. For instance, ten to one compression usually may result in an image that cannot be distinguished by the eye from the original, but a hundred to one compression may bear little resemblance to the original. According to an embodiment, a lower JPEG compression ratio may be used to compress higher dominance color data corresponding to the C, M, and K planes, and a higher compression JPEG ratio may be used to compress lower dominance color data corresponding to the Y-plane. In some embodiments, both the lower resolution image and the delta image calculated for each color plane may be compressed using compressor 206.

Compressed color data may be passed from compressor 206 to a data size inspector 207. Data size inspector 207 may be configured to determine if all bitmap images can be sent across connection 120 without exceeding the bandwidth of connection 120. In some embodiments, data size inspector 207 may make its determination on a block by block basis, depending on the size of the buffers in printer controller 180 and/or on the granularity of the resolution switching scheme. For example, for the smallest granularity, the determination may be made on a line by line basis.

In some embodiments, data size inspector 207 may inspect a block of the original image data and determine the total data size of those portions of compressed color data for each color plane that correspond to the block. Data size inspector 207 may then compare the total data size with a data-size threshold. According to one embodiment, the data-size threshold may be determined based on the print speed of printer 100 and the bandwidth of connection 120. Data size inspector 207 may tag a block if it has a data size that is larger than the data-size threshold.

Compressed color data may be further passed from data size inspector 207 to a formatter 208. Formatter 208 may be configured to accumulate one full image in memory before passing it to USB interface 282 and transferring to printer 100. Consistent with one embodiment of the present disclosure, formatter 208 may be further configured to examine if a block image received from data size inspector 207 is tagged. If a block is tagged, formatter 208 may remove the portion of the delta image that is associated with the tagged block for one or more color planes. In some embodiments, formatter 208 may first remove the delta image associated with less dominant color planes, i.e., color planes that have orders of dominance lower than a rank threshold.

To avoid unsightly resolution transitions in the middle of highly detailed images, such as photographs, in some embodiments, formatter 208 may grow a non-transition region from a block that is tagged until a "safe-transition" block is reached. The non-transition region may be a region not suitable for resolution transitions. For example, the non-transition region may include high resolution details of the image, or may be data intensive portion of the image. In some embodiments, the resolution of each block in the non-transition region can be reduced. A safe-transition block may contain relatively low-resolution image information such that reducing the image resolution may not affect the visual quality of the image and thus, a resolution transition may not be noticeable by human eyes. For example, a region where there is only white space (blank space) or solid colors may be suitable for resolution transition.

The non-transition region may include at least one image block. For example, the block that is tagged may be included along with sets of contiguous blocks. In some embodiments, formatter 208 may be configured to grow the non-transition region by including blocks adjacent to one edge of the region, if this adjacent block is not a safe-transition block. Once safe-transition blocks are reached on both ends of the region, formatter 208 may stop growing the region and remove the portion of the delta image that is associated with the entire non-transition region.

For a block that is neither tagged nor included in a region grown from a tagged block, formatter 208 may reconstruct the block based on the corresponding portions of the compressed lower resolution image and the compressed delta image. Formatter 208 may then buffer one full image in the memory, where the buffered image includes blocks of reduced resolution and blocks of original resolution. Formatter 208 may provide the accumulated full image to USB interface 282.

USB interface 282 of computer 200 may transfer buffered image data in a compressed form to USB interface 102 of printer 100 via connection 120. In some embodiments, USB interface 282 may also transfer information related to the compression algorithms and parameters used to compress the color data by compressor 206 to USB interface 102 of printer 100 via connection 120, along with the buffered image. The information may be used later in de-compressor unit 106 on printer 100. In some embodiments, an isochronous mode of transfer may be supported so that a certain amount of bandwidth may be reserved for each C/M/Y/K image component, and data delivery at a corresponding transfer rate may be guaranteed. In some embodiments, a same bandwidth may be reserved for each sub-channel. In some other embodiments, various bandwidths may be reserved for different sub-channels.

In some embodiments, the compressed image data may be decompressed by de-compressor module 106 using de-compression algorithms corresponding to the compression algorithms used by compressor 206. For example, if JBIG compression is used by compressor 206, the JBIG decompression may be used by de-compressor module 106. When a lossy compression is used by compressor 206, de-compression may not exactly reconstruct the image data as in print spool file 210. In some embodiments, in compressor 206, different compression algorithms or different compression parameters of a same compression algorithm may be used for the different image component to achieve the desired compression ratios. Accordingly, de-compressor module 106 may de-compress each image component based on the algorithms and/or parameters used by compressor 206.

In some embodiments, de-compressor module 106 may pass the decompressed image data to PWM logic module 107. The resultant PWM pulses from PWM logic module 107 may then be streamed to driver circuit 108, which may then transmit the PWM pulses to printhead 109. In some embodiments, images may be decompressed block-by-block. Consistent with an embodiment disclosed later in this disclosure, each block of the decompressed image data may have a different resolution. For example, a block may have a resolution of 480 dpi, and another block may have a resolution of 600 dpi, as shown in the exemplary embodiment below. In some embodiments, PWM logic module 107, therefore, may be constructed to be able to dynamically switch itself in either a high resolution mode (for 600-dpi-driving) or a low resolution mode (for 480-dpi-driving) block-by-block basis. Any conventional method or mechanism may be deployed for switching of the operation mode of PWM logic module.

Figure 3:
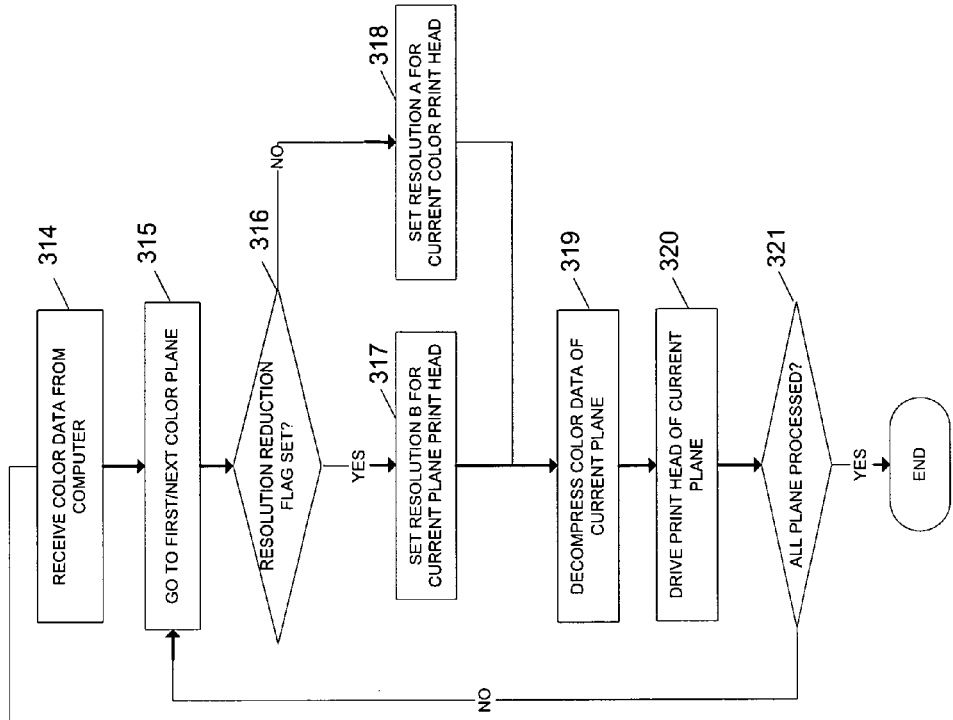
FIG. 3 is a flow chart of an exemplary operation process for color data resolution switching.
Figure 3:
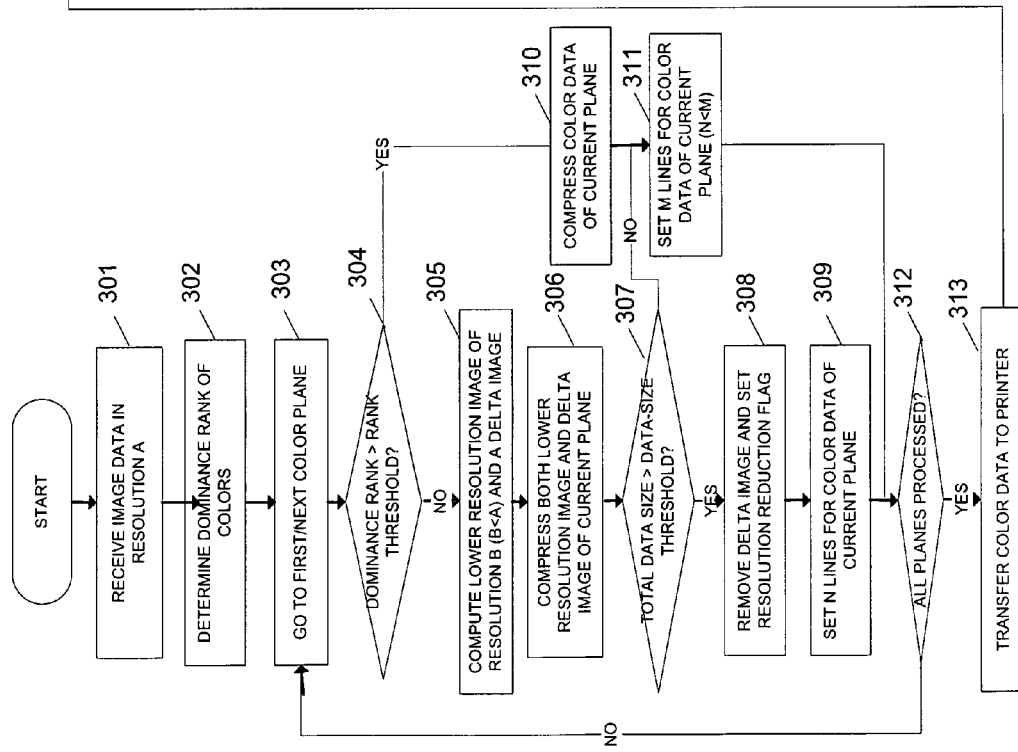

FIG. 3 is a flow chart of an exemplary operation process for color data resolution switching according to the disclosed embodiments. The algorithm described in FIG. 3 may also be applied to various other types of printing systems such as, for example, copiers and multi-function devices, with appropriate modifications specific to the device and in a manner consistent with embodiments disclosed herein. The algorithm described in FIG. 3 may further be used in conjunction with various software applications to perform resolution switching.

Process 30 may include a computer processing stage 31 and a printer processing stage 32. Computer processing stage 31 may include steps 301-310. In step 301, image data may be received. For example, application 201 may generate a print spool file 210 that contains print image data and printing instructions and print spool file 210 may be received by printer processor 203 from application 201. The original image data may have an original resolution A, which may be indicated in dots per inch ("dpi") (e.g., A=600 dpi). In some embodiments, the image data may include multiple components associated with multiple color planes.

In step 302, based on the image data, an order of dominance between color planes may be determined. For example, dominance calculator 215 may be optionally used to determine the order of dominance. In some embodiments, an order of dominance may be determined by counting the number of bitmap dots for each color and ranking the colors based on the numbers. In some embodiments, order of dominance among color planes may also be determined by generating gradation histograms for each color and ranking the colors based on the complexity of the histograms. As an example, computer 200 may use a CMYK color space which includes a cyan plane, a magenta plane, a yellow plane and a black plane, and the yellow plane may be determined as the least dominant plane. In some embodiments, the order of dominance may be pre-determined and set for printer 100, so that step 302 may be skipped. For example, the yellow plane may be set as the least dominant color plane for a printer 100 that uses CMYK color space.

In some embodiments, a number indicating dominance rank may be assigned to each color to indicate its dominance rank among the polarity of colors. For example, a lower rank may be assigned to a less dominant color. For example, a plane with dominance rank 1 may be the least dominant. In some embodiments, the dominance rank can be an integer varying from 1 to N, where N is the number of color planes. For the purposes of this discussion, a plane with a higher dominance rank is assumed to be more dominant than a plane with a lower dominance rank and the dominance rank is assumed to be an integer between 1 and the number of color planes. Therefore, in a four-dimensional color space, a color plane with dominance rank 2 is more dominant than a color plane with dominance rank 1, and the color plane with dominance rank 4 is the most dominant. As may be appreciated by one of reasonable skill in the art, the algorithm can easily be modified if a different scheme is used to determine the dominance rank.

In step 303, the first or next color plane may be processed. In step 304, the algorithm may determine if the dominance rank of the current color plane exceeds a pre-determined rank threshold. In some embodiments, the rank threshold may be determined based on the print speed of printer 100 and the bandwidth of connection 120. For example, the rank threshold may be set lower if the bandwidth of connection 120 is large compared to the size of the print data. In some embodiments, the rank threshold may be set higher than the dominance rank corresponding to the most dominant color so that the rank threshold may not be exceeded by any color plane.

If the dominance rank of the current color plane does not exceed the rank threshold then, in step 305, a lower resolution image and a corresponding delta image may be computed for the current plane color data. For example, rasterizer 205 may compute the lower resolution image and the delta image for the image data of the current plane. For example, a lower resolution image with a resolution of 480 dpi may be computed from an original image with a resolution of 600 dpi. A corresponding delta image may also be computed simultaneously. The delta image may represent the difference information between the original image and the lower resolution image. The computation of the delta image may be mathematically reversed to reconstruct the original image from the lower resolution image and the delta image.

After the lower resolution image and delta image are computed in step 305, both images may be compressed in step 306. For example, the images may be compressed by compressor 206. Compression may further reduce the size of the images. For example, compressor 206 may use lossless compression methods, so that the image may be accurately reconstructed by decompression. In some embodiments, images containing high resolution details may not be compressed sufficiently and thus, the data size of the images may not be significantly reduced after compressions.

In step 307, the algorithm may determine if both images can be sent across connection 120 without exceeding the bandwidth of connection 120. In some embodiments, the total data size of the compressed lower resolution image and delta image may be determined. The total data size may be compared with some pre-determined data-size threshold. According to one embodiment, the data-size threshold may be determined based on the print speed of printer 100 and the bandwidth of connection 120.

In step 308, if the total data size exceeds the data-size threshold, the delta image corresponding of the current plane may be removed and the current plane may be tagged with a resolution reduction flag. Removal of the delta image may reduce the resolution of the color data of the current plane, for example, from 600 dpi to 480 dpi. Meanwhile, removal of the delta image may also reduce the size of the color data associated with the current plane. In some embodiments, the resolution reduction flag may indicate that the delta image corresponding to the current plane has been removed.

In some embodiments, the determination in step 307 may be made on a block by block basis. For example, the images may be separated into blocks. For the smallest granularity, the blocks may be individual lines of the image. For example, the determination may be made on a line by line basis, and the total pixel number of each line of the compressed lower resolution image and each line of the compressed delta image may be determined by data size inspector 207.

Accordingly, delta image removal in step 308 may also be performed on a block by block basis. For example, if the total data size of a compressed block exceeds a data-size threshold, the delta image corresponding to the block may be removed. In some embodiments, the algorithm may grow a non-transition region based on the block and remove all corresponding delta image blocks in the non-transition region. For example, the non-transition region may include at least one block of the image including the resolution-reduced block, and some previous blocks. In some embodiments, the non-transition region may be grown by including into the non-transition region a block adjacent to the growing edge of the region, if the block is not a safe-transition block. The non-transition region may be a region not suitable for resolution transitions. For example, the non-transition region may include high resolution details of the image, or may be a data intensive portion of the image. Once a safe-transition block is reached, the region growing may be stopped and the portion of the delta image that is associated with the entire grown region may be removed. Accordingly, the resolution of the color data of the current plane may be reduced from resolution A to resolution B, based on the resolution of the delta image.

In step 309, the algorithm may set a number of N scan lines for the current plane. The number of scan lines may be chosen based on resolution B. For example, a larger number of scan lines may be used for a higher resolution B. In some embodiments, a beam detect sensor 112 may generate a start of scan (SOS) or "hsync" signal for scan lines in an image. Therefore, the number of SOS signals is proportional to resolution B, and printing speed may be reduced, if B is high.

In step 307, if the total data size does not exceed the data-size threshold, the color data of the current plane may not exceed the bandwidth so that no resolution reduction may be needed and the algorithm may proceed to step 311.

In step 304, if the dominance rank of the current color plane exceeds the rank threshold then, in step 310, the color data of the current plane may be compressed. Accordingly, in step 311, the algorithm may set a number of scan lines M for the current plane. The number of scan lines may be chosen based on resolution A. In some embodiments, M may be larger than N set in step 309 if resolution A is higher than resolution B.

In step 312, it may be determined whether all the color planes have been processed by the computer. If there is still at least one color plane of the print image left unprocessed, the algorithm may go back to step 303 and process the next color plane. The algorithm can iterate through steps 303-312 until all the color planes have been processed by the computer. In step 313, color data of all the color planes may be transferred to a printer in a compressed format. For example, color data may be transferred from computer 200 to printer 100 via connection 120. In some embodiments, color data of the multiple color planes may be transferred in a parallel manner. In some embodiments, in step 313, information related to the compression algorithms and parameters used to compress the color data in steps 306 and 310 may be transferred to printer 100 via connection 120, along with the compressed color data. For example, the information may be included as a header of the compressed color data.

In some embodiments, computer processing stage 31 may conclude at this point and printer processing stage 32 may begin at step 314. In some embodiments, printer processing stage 32 may include steps 314-321. In step 314, color data for all the color planes may be received by a printer (e.g., printer 100). In step 315, the first or next color plane may be processed. In step 316, the algorithm may determine if a resolution reduction flag is set for the current color plane. If the resolution reduction flag is set, it indicates that the resolution of the color data of the current color plane has been reduced in step 308.

In step 317, a print resolution in the main scan direction may be set for the printhead of the current plane corresponding to resolution B. In some embodiments, printer 100 may use a CMYK color space and printhead 109 may comprise four printheads corresponding to the C, M, Y, and K planes and the resolution for each printhead may be independently configurable. In step 317, a reduced resolution B, may be set for the current color plane. For example, the resolution of data in the Y plane may be reduced. If the resolution reduction flag is not set, in step 318, a print resolution A may be set for the printhead of the current plane.

In step 319, the color data of the current plane may be decompressed. For example, the color data of the current plane may be decompressed by de-compressor unit 106 using de-compression algorithms and parameters corresponding to the compression algorithms and parameters used in step 306 or step 310. For example, if JBIG compression is used in step 306, the JBIG decompression may be used in step 319. In some embodiments, the header in the print data transferred in step 313 may indicate the type of compression used in steps 306 or 310.

In step 320, the printhead may be driven to print the color data of the current plane to develop a toner image for the current plane. For example, in printer 100, PWM pulses from PWM logic module 107 may be streamed to driver circuit 108, which may then transmit the PWM pulses to printhead 109. In some embodiments, laser beam from printhead 109 may be modulated and reflected off scanning mirror 110 and optical system 113, causing a latent image of charged and discharged areas to be built up on photosensitive drum 114, and a toner image may be developed based on this latent image at the developing station 115.

In step 321, it may be determined whether all the color planes have been processed by the printer. If there is still at least one color plane of the print image left unprocessed, the algorithm may go back to step 315 and process the next color plane. The algorithm can iterate through steps 315-321 until all the color planes have been processed by the printer, after which printer processing stage 32 may conclude.

Figure 4:
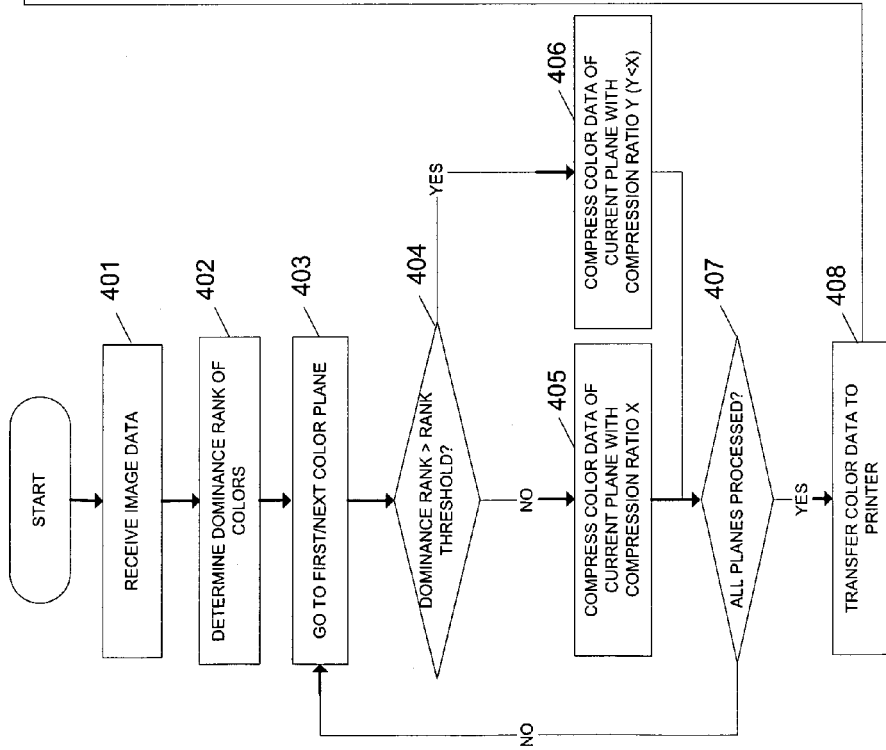
FIG. 4 is a flow chart of an exemplary operation process for color data compression ratio switching.
Figure 4:
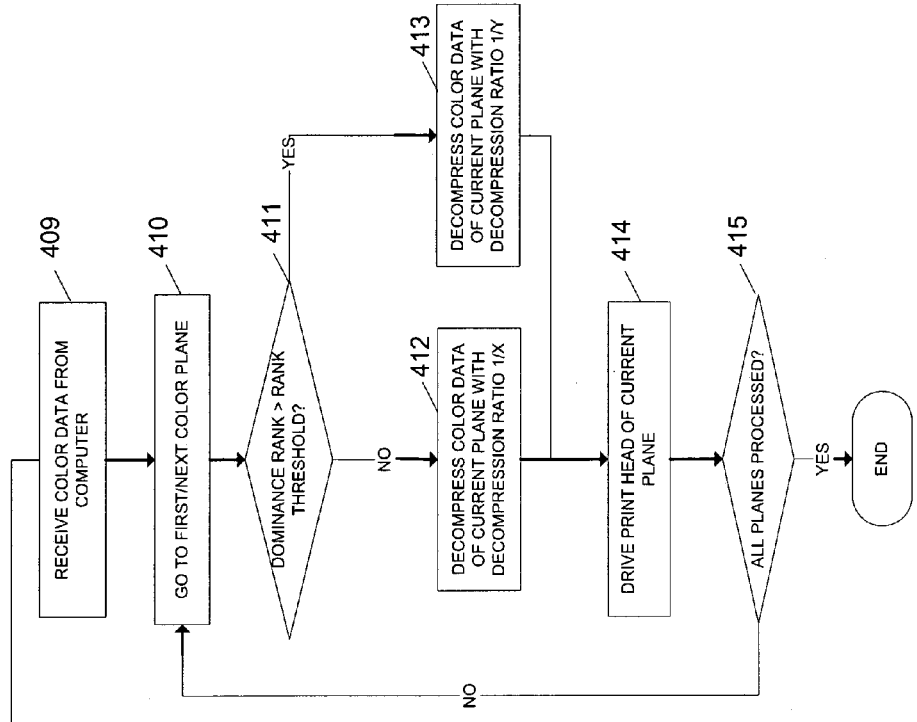

FIG. 4 is a flow chart of an exemplary process 40 for color data compression ratio switching. The algorithm described in FIG. 4 may also be applied to various other types of printing systems such as, for example, copiers and multi-function devices, with appropriate modifications specific to the device and in a manner consistent with embodiments disclosed herein. The algorithm described in FIG. 4 may further be used in conjunction with various software applications to reduce the size of color data. For example, it may be used in conjunction with the algorithm described in FIG. 3.

Process 40 may include a computer processing stage 41 and a printer processing stage 42. Computer processing stage 41 may include steps 401-408. In step 401, image data may be received. In some embodiments, the image data may include multiple components associated with multiple color planes. In step 402, based on the image data, an order of dominance between color planes may be determined, for example, by dominance calculator 215. Embodiments of determining the dominance rank are similar to those disclosed in connection with step 302 of process 30, in FIG. 3. In some embodiments, the algorithm may skip step 402 if the order of dominance is pre-determined and set for process 40. For example, the yellow plane may be set as the least dominant color plane.

In step 403, the first or next color plane may be processed. In step 404, the algorithm may determine if the dominance rank of the current color plane exceeds a pre-determined rank threshold. In some embodiments, the rank threshold may be determined based on the print speed of printer 100 and the bandwidth of connection 120.

If the dominance rank of the current color plane does not exceed the rank threshold then, in step 405, the color data of the current plane may be compressed with a compression ratio X. Compression ratio may vary among various compression algorithms and/or various parameter sets used for a same compression algorithm. In some embodiments, computer 200 may include a plurality of compressors configured to compress color data of a plurality of color planes. For example, compressor 206 may include four sub-compressors for compressing the C, M, Y, and K data with different compression ratios. In some embodiments, higher compression algorithms may be used for compressing color data of lower dominance to achieve desired compression ratios. For example, more sophisticated compression algorithms such as JPEG may be used for the color data of the current plane in step 405.

In some embodiments, compression parameters corresponding to higher compression ratios may be used for a compression algorithm applied on color data of lower dominance. For example, more aggressive divisors may be used in the quantization phase of JPEG compression to compress the color data of the current plane in step 405. According to an embodiment, for a printer that uses CMYK color space, a higher compression ratio may be used for compressing the Y-plane color data.

In some embodiments, the color data of the current plane may be compressed by using lower bit depth. For example, color data that are originally represented using 4 bits may be truncated to 2 bits. Accordingly, the size of the color data may be reduced in half (equivalent to a compression ratio of 2).

In step 404, if the dominance rank of the current color plane exceeds the rank threshold then, in step 406, the color data of the current plane may be compressed with a compression ratio Y. In some embodiments, compression ratio Y may be lower than compression ratio X. Accordingly, the color data of the current plane that has a higher dominance order may be compressed less significantly. For example, for a printer that uses CMYK color space, a lower compression ratio Y may be used for compressing the color data of the C, M and K plane.

In some embodiments, lower compression algorithms may be used for compressing color data of higher dominance. For example, simpler compression algorithms may be used for the color data of the current plane in step 406. In some other embodiments, compression parameters corresponding to lower compression ratios may be used for a compression algorithm applied on color data of higher dominance. For example, less aggressive divisors may be used in the quantization phase of JPEG compression to compress the color data of the current plane in step 406.

In step 407, it may be determined whether all the color planes have been processed by the computer. If there is still at least one color plane of the print image left unprocessed, the algorithm may go back to step 403 and process the next color plane. The algorithm can iterate through steps 403-407 until all the color planes have been processed by the computer. In step 408, color data of all the color planes may be transferred to a printer in a compressed format. For example, color data may be transferred from computer 200 to printer 100 via connection 120. In some embodiments, color data of the multiple color planes may be transferred in a parallel manner. In some embodiments, in step 408, information related to the compression algorithms and parameters used to compress the color data in steps 405 and 406 may be transferred to printer 100 via connection 120, along with the compressed color data. For example, the information may include the type of compression algorithms used, the set of parameters used for these compression algorithms, and compression ratios. The information may be included as a header of the compressed color data. In some embodiments, the dominance order of the plurality of color planes, determined in step 402, may also be included in the header of the compressed color data and transferred from computer 200 to printer 100, in step 408.

In some embodiments, computer processing stage 41 may conclude after step 408 and printer processing stage 42 may begin at step 409. In some embodiments, printer processing stage 42 may include steps 409-415. In step 409, color data for all the color planes may be received by a printer (e.g., printer 100). In step 410, the first or next color plane may be processed by the printer. In step 411, the algorithm may determine if the dominance rank of the current color plane exceeds a pre-determined rank threshold.

If the dominance rank of the current color plane does not exceed the rank threshold, it indicates that compression ratio X is used in step 405. Accordingly, in step 412, the color data of the current color plane may be de-compressed with decompression ratio 1/X. For example, de-compressor module 106 of printer 100 may select a de-compression algorithm and associated parameters based on the corresponding compression algorithm and/or parameters used by compressor 206 in step 405 for the current color plane. For example, if JPEG compression with compression ratio X is used in step 405, the JPEG decompression with de-compression ratio 1/X may be used in step 412.

If the dominance rank of the current color plane exceeds the rank threshold, it indicates that compression ratio Y is used in step 406. Accordingly, in step 413, the color data of the current color plane may be de-compressed with decompression ratio 1/Y. For example, if JBIG compression with compression ratio Y is used in step 406, the JBIG decompression with de-compression ratio 1/Y may be used in step 413.

In step 414, the printhead may be driven to print the color data of the current plane to develop a toner image for the current plane. In step 415, it may be determined whether all the color planes have been processed by the printer. If there is still at least one color plane of the print image left unprocessed, the algorithm may go back to step 410 and process the next color plane. The algorithm can iterate through steps 410-415 until all the color planes have been processed by the printer, after which printer processing stage 42 may conclude.

Various algorithms may be used to determine the dominance rank between a plurality of color planes for a print image such as in step 302 of process 30 and step 402 of process 40. For example, two exemplary processes may be implemented by dominance calculator 215 for determining the dominance rank are shown in FIG. 5.

Figure 5B:
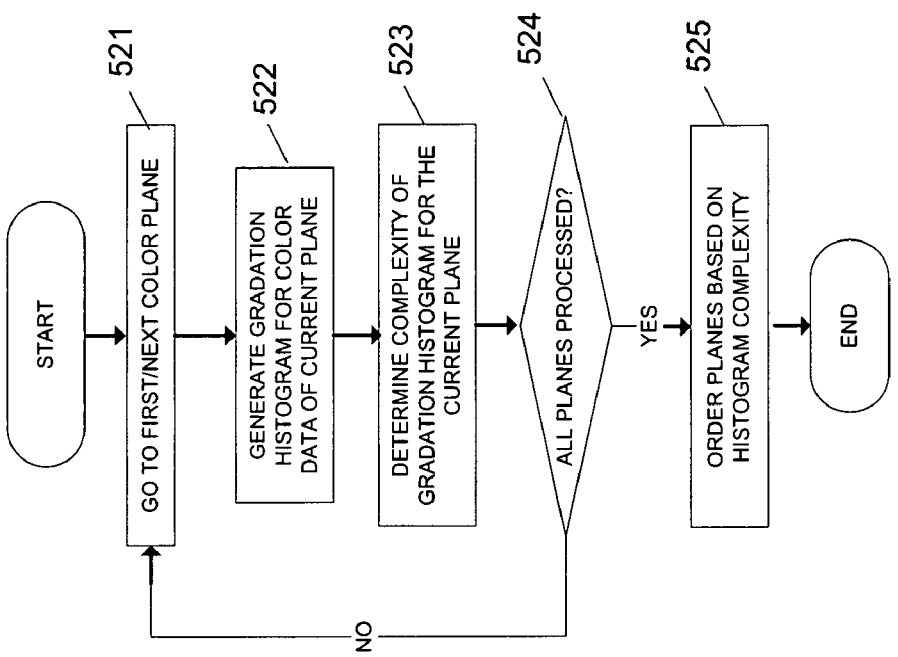
FIG. 5b shows a flow chart of a second exemplary operation process for determining dominance rank.
Figure 5A:
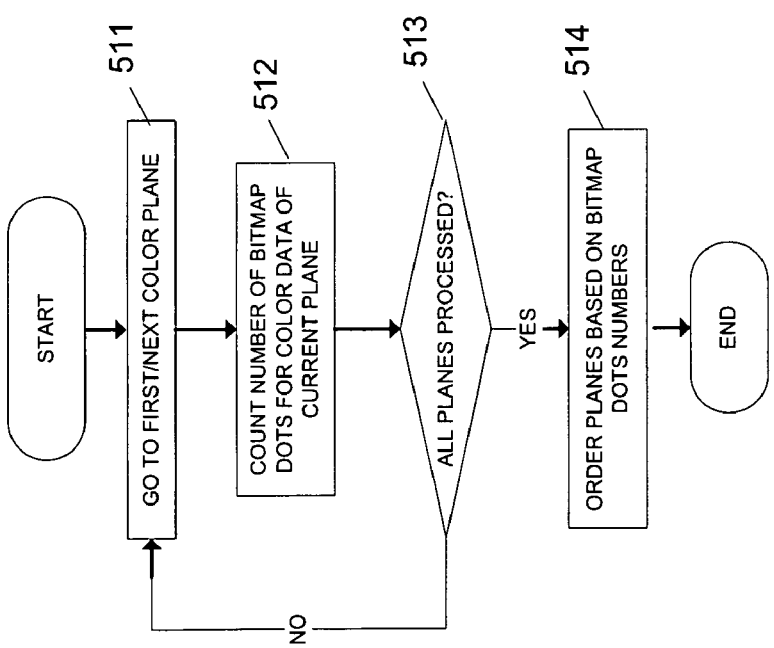
FIG. 5a shows a flow chart of a first exemplary operation process for determining dominance rank.

FIG. 5*a* shows a flow chart of a first exemplary operation process 51 for determining dominance rank. In exemplary process 51, dominance rank among color planes may be determined by counting the number of bitmap dots for each color and ranking the colors based on the numbers. In step 511, the first or the next color plane may be considered. In step 512, the total number of bitmap dots may be counted for the color data of the current color plane. In step 513, it may be determined whether all the color planes have been considered and bitmap dots counted. If there is still at least one color plane of the print image left unconsidered, the algorithm may iterate through steps 511-513 until all the color planes have been considered.

In step 514, the plurality of color planes may be ordered based on the bitmap dot numbers counted in step 513. For example, the color planes may be ordered in a descending order of dot numbers. In some embodiments, a number may be assigned to each color indicating its dominance rank relative to the other colors. For example, a smaller number may be assigned to a less dominant color. As an example, a rasterized image in a CMYK color space may include the least bitmap dots in the Y plane, among all the four color planes. Accordingly, the Y plane may be assigned a lowest dominance rank indicating that it is least dominant color plane among all the planes.

FIG. 5*b* shows a flow chart of a second exemplary operation process 52 for determining dominance rank. In exemplary process 52, dominance rank among color planes may be determined based on complexities of gradation histograms corresponding to the plurality of color planes. In step 521, the first or the next color plane may be considered. In step 522, a gradation histogram may be generated for color data of the current color plane. For example, the gradation histogram may be generated by a routine of dominance calculator 215 in computer 200. In some embodiments, gradation histogram may be a histogram chart indicating the distribution of color gradation, and complexity of the histogram may indicate the level degree to which human eyes may be sensitive to the data.

In step 523, complexity of the gradation histogram for the current plane may be determined. In some embodiments, parameters such as the breadth, number of peaks, etc. of the histogram may be used to indicate the complexity. For example, color data that have narrow histogram may suggest that the data may be sufficiently represented by a subset of the current color plane. Accordingly, higher compression ratio may be used to compress the data, and/or lower resolution may be used for the data. In step 524, it may be determined whether all the color planes have been considered and bitmap dots counted. If there is still at least one color plane of the print image left unconsidered, the algorithm may iterate through steps 521-524 until all the color planes have been considered.

In step 525, the plurality of color planes may be ordered based on the complexities of histograms determined in step 523. For example, the color planes may be ordered in a descending order of complexity. In some embodiments, a number may be assigned to each color indicating its dominance rank relative to the other colors. For example, a smaller number is assigned to a color plane associated with a simpler histogram. For example, the Y plane color data in a CMYK color space may have a simplest gradation histogram among the four planes. Accordingly, the Y plane may be assigned a lowest order number indicating that it is the least dominant color plane among all the planes.

Other embodiments of the invention will be apparent to those skilled in the art from consideration of the specification and practice of the invention disclosed herein. In some embodiments, the algorithm described in FIG. 3 and the algorithm described in FIG. 4 can be switched or combined in accordance with the print image and the color space used by the printer. For example, the exemplary process 30 explained in FIG. 3 may be applied to print images that comprise lower resolution information in one or more color planes, and the exemplary process 40 explained in FIG. 4 may be applied to print images that have sparse color data in one or more color planes. As another example, the exemplary process 40 explained in FIG. 4 may be applied to color planes with lower dominance orders, and the exemplary process 30 explained in FIG. 3 may be applied to color planes with relatively higher dominance orders. As a further example, the exemplary process 30 explained in FIG. 3 may be combined with the exemplary process 40 explained in FIG. 4 in a way that both the resolution switch and the compression ratio switch are applied to the color planes with lower dominance orders. It is intended that the specification and examples be considered as exemplary only, with a true scope and spirit of the invention being indicated by the following claims.

What is claimed is:

1. A method for reducing data size of at least one bitmap image, wherein the bitmap image comprises a plurality of image components, wherein each image component is associated with a distinct color plane, the method comprising:
ranking the plurality of color planes using a dominance rank, wherein the dominance rank for a color plane is based on data in its associated image component; and
reducing the data size of the at least one image component, based on the dominance rank of the color plane associated with the image component,
wherein ranking the plurality of color planes using a dominance rank further comprises:
generating a gradation histogram for each image component;
sorting the image components in ascending order of complexity of the gradation histograms; and
assigning a dominance rank to a color plane based on the order of the image component associated with the color plane.

2. The method of claim 1, wherein reducing the data size of at least one image component includes reducing a resolution of the at least one image component, if the corresponding dominance rank is below a rank threshold.

3. The method of claim 2, wherein reducing a resolution of the at least one image component includes:
deriving a lower resolution image and a delta image from the image component;
compressing the lower resolution image and the delta image; and
removing the compressed delta image if the sum of a data size of the compressed lower resolution image and a data size of the compressed delta image exceeds a data-size threshold.

4. The method of claim 2, further comprising setting a print resolution for at least one color plane associated with the at least one image component based on the resolution of the image component of the at least one color plane.

5. The method of claim 2, further comprising setting a print speed for at least one color plane associated with the at least one image component based on the resolution of the image component of the at least one color plane.

6. The method of claim 1, wherein reducing the data size of the at least one image component includes:

using a first bit depth for the at least one image component, if the corresponding dominance rank is below a rank threshold; and using a second bit depth for the at least one image component, if the corresponding dominance rank is not below the rank threshold, wherein the first bit depth is lower than the second bit depth.

7. The method of claim 1, wherein reducing the data size of the at least one image component includes:

compressing the at least one image component with a first compression ratio, if the corresponding dominance rank is below a rank threshold; and compressing the at least one image component with a second compression ratio, if the corresponding dominance rank is not below the rank threshold, wherein the first compression ratio is higher than the second compression ratio.

8. The method of claim 7, wherein the first compression ratio is realized by using a first compression algorithm, and the second compression ratio is realized by using a second compression algorithm.

9. The method of claim 7, wherein the first compression ratio is realized by using a first set of compression parameters for a compression algorithm, and the second compression ratio is realized by using a second set of compression parameters for the compression algorithm.

10. A non-transitory computer-readable medium that contains instructions which, when executed by a processor, performs steps in a method for reducing data size of at least one bitmap image, wherein the bitmap image comprises a plurality of image components, wherein each image component is associated with a distinct color plane, the method comprising:

ranking the plurality of color planes using a dominance rank, wherein the dominance rank for a color plane is based on data in its associated image component; and reducing the data size of the at least one image component, based on the dominance rank of the color plane associated with the image component, wherein ranking the plurality of color planes using a dominance rank further comprises:

generating a gradation histogram for each image component;

sorting the image components in ascending order of complexity of the gradation histograms; and assigning a dominance rank to a color plane based on the order of the image component associated with the color plane.

11. The non-transitory computer-readable medium of claim 10, wherein reducing the data size of at least one image component includes reducing a resolution of the at least one image component, if the corresponding dominance rank is below a rank threshold, wherein reducing a resolution of the at least one image component includes:

deriving a lower resolution image and a delta image from the image component;

compressing the lower resolution image and the delta image; and removing the compressed delta image if the sum of a data size of the compressed lower resolution image and a data size of the compressed delta image exceeds a data-size threshold.

12. The non-transitory computer-readable medium of claim 10, wherein reducing the data size of the at least one image component includes:

using a first bit depth for the at least one image component, if the corresponding dominance rank is below a rank threshold; and using a second bit depth for the at least one image component, if the corresponding dominance rank is not below the rank threshold, wherein the first bit depth is lower than the second bit depth.

13. The non-transitory computer-readable medium of claim 10, wherein reducing the data size of the at least one image component includes:

compressing the at least one image component with a first compression ratio, if the corresponding dominance rank is below a rank threshold; and compressing the at least one image component with a second compression ratio, if the corresponding dominance rank is not below the rank threshold, wherein the first compression ratio is higher than the second compression ratio.

14. A system for reducing data size of at least one bitmap image, wherein the bitmap image comprises a plurality of image components, wherein each image component is associated with a distinct color plane, the system comprising:

a memory configured to store the at least one bitmap image; and a processor, including:

a dominance calculator configured to:

generate a gradation histogram for each image component;

sort the image components in ascending order of complexity of the gradation histograms;

assign a dominance rank to a color plane based on the order of the image component associated with the color plane; and rank the plurality of color planes using the dominance rank; and a compressor configured to reduce the data size of the at least one image component, based on the dominance rank of the color plane associated with the image component.

15. The system of claim 14, wherein the processor further comprises:

a rasterizer configured to derive a lower resolution image and a delta image from the image component;

a data size inspector configured to, after the lower resolution image and the delta image are compressed, determine if the sum of a data size of the compressed lower resolution image and a data size of the compressed delta image exceeds a data-size threshold; and a formatter configured to remove the compressed delta image if the sum exceeds the data-size threshold.

16. The system of claim 14, wherein the compressor further comprises:

a first compressing unit configured to compress the at least one image component with a first compression ratio, if the corresponding dominance rank is below a rank threshold; and a second compressing unit configured to compress the at least one image component with a second compression ratio, if the corresponding dominance rank is not below the rank threshold, wherein the first compression ratio is higher than the second compression ratio.

* * * * *